US011385927B2

(12) United States Patent
Belits et al.

(10) Patent No.: US 11,385,927 B2
(45) Date of Patent: Jul. 12, 2022

(54) INTERRUPT SERVICING IN USERSPACE

(71) Applicant: Marvell International Ltd., Hamilton (BM)

(72) Inventors: Alexander Belits, San Jose, CA (US); Prasun Kapoor, Fremont, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/737,786

(22) Filed: Jan. 8, 2020

(65) Prior Publication Data

US 2021/0208928 A1 Jul. 8, 2021

(51) Int. Cl.
*G06F 9/48* (2006.01)
*G06F 9/30* (2018.01)

(52) U.S. Cl.
CPC ........ *G06F 9/4812* (2013.01); *G06F 9/30098* (2013.01)

(58) Field of Classification Search
CPC ........................... G06F 9/4812; G06F 9/30098
USPC ........................................................ 710/267
See application file for complete search history.

(56) References Cited

U.S. PATENT DOCUMENTS

| 2006/0136641 | A1* | 6/2006 | Takemori | G06F 9/4812 710/260 |
| 2012/0200579 | A1* | 8/2012 | Hartog | G06F 9/4812 345/503 |
| 2017/0199772 | A1* | 7/2017 | Chen | G06F 9/526 |
| 2018/0136968 | A1* | 5/2018 | Clissold | G06F 9/461 |
| 2020/0341792 | A1* | 10/2020 | Tsirkin | G06F 9/45533 |

* cited by examiner

Primary Examiner — Idriss N Alrobaye
Assistant Examiner — Brooke J Taylor

(57) ABSTRACT

A method for handling an interrupt includes receiving, in hardware or in firmware, a request from a task executing in userspace, where the request is to assign a function in the task and state information for the task to an interrupt. The hardware or firmware records the state information for the task, and assigns defined state information for the function to an event caused by the interrupt. When the interrupt occurs, the interrupt is serviced by saving context including the state information for the task in the memory, loading the defined state information for the function into registers, running the function, and then returning to the task preempted by the interrupt.

20 Claims, 5 Drawing Sheets

INTERRUPT SERVICING IN USERSPACE

BACKGROUND

In contemporary computer systems, interrupts are a widely used mechanism to implement processing of various events by software. An interrupt may be triggered by an event that is internal or external to the central processing unit (CPU), and results in a signal on an interrupt line or a transaction (some value or message) sent through a bus. When the interrupt is delivered to the CPU, the currently running task is temporarily suspended (interrupted) and the CPU state is saved. The CPU executes an interrupt service routine (ISR), which is typically designed to react to the event that caused the interrupt. After completion of the ISR, the CPU state is restored and the CPU is returned to resume running the interrupted task.

Normally, the interrupted task does not have to be specifically designed to work as intended while an interrupt is happening; its logic is unaffected by the interrupt because the state is saved and restored by the combination of hardware and software that handles the interrupt. There are some sections of executable code, usually called critical sections, that may interact with data or device registers that are also accessed by the ISRs. Various mechanisms, such as disabling all or some interrupts, may be employed in such sections to prevent inconsistencies. Many of those mechanisms are identical or similar to those used to prevent inconsistencies in a multi-CPU system because, from the point of view of a running program, an ISR runs simultaneously with it. Also, sometimes it is possible to make the ISRs completely or mostly self-contained so they can perform operations on their own for the most part, accessing devices and memory that are otherwise inaccessible. In that case, ISRs may grow to be large and run for an amount of time that noticeably delays other routines that it preempts. This effectively turns ISRs into a high-priority task.

Contemporary operating systems (OSs) usually include some mechanism for organizing ISRs. A general-purpose OS has a kernel that includes and manages ISRs along with mechanisms that allow ISR writers to mark, defer, or schedule processing from ISRs, coalesce events that would produce multiple interrupts into one interrupt, and efficiently distribute the various types of work that should be performed when triggered by events that cause interrupts. Userspace, where tasks (e.g., applications and libraries) run, usually does not have a concept of an interrupt, and instead has a scheduler that wakes up (resumes) tasks waiting for OS-level events that may be caused by interrupts and may issue signals (interrupt-like invocation of user functions) registered to run on such events. This reflects the requirements of a high-performance server that is optimized to perform as much work as possible in a unit of time with minimal amount of operations that involve switching context, saving state, invalidating caches, and manipulations on virtual memory configurations.

Desktop and mobile OSs usually add a requirement for fast responses to a particular type of request, such as one coming from the local user's interaction with input, graphics, or sound devices. Efforts are made to prioritize tasks and drivers, dedicate resources to them, and allow them to preempt what would otherwise be non-preemptible operations. None of this requires changes to the interrupt and event handling mechanism, scheduler, or OS interface.

Embedded OSs place a different set of requirements on event handling, because they often have to perform an operation within a defined amount of time. Traditional scheduling and even interrupt handling in drivers are often insufficient, because the OS may be designed to delay them with a goal of processing them more efficiently.

To better convert traditional OSs for use in embedded systems, developers employed a number of different approaches. In one approach, a special real-time OS (RTOS) is used for real-time work. These OSs usually have suitable reaction time, but their programming model is complex and unfamiliar to many developers. Because those systems have to handle modern hardware, they end up being complex, and their development has to parallel other systems. They often have great real-time functionality but suffer from the OS core lagging behind the current state of the art. This can be countered by limiting their functionality, but then they may have to run another OS on other cores of the same CPU to implement the missing functionality.

Another approach is to introduce real-time functionality into a traditional OS. This mostly takes the form of changing the preemption model to reduce the number of critical sections and allow preemption in situations that did not allow it before. The similarity between the behavior of a system running routines on multiple cores with a core running a routine that is preempted by an interrupt allows developers to produce common solutions for both cases. However, the amount of latency is limited, which precluded a clear and reliable guaranteed upper limit for latency in situations where microsecond precision is necessary.

A third approach combines the above approaches either by virtualization of the real-time and traditional OSs under a common hypervisor, or by running both traditional and real-time OSs as subsystems under a common real-time-aware scheduling mechanism and interrupt management system. This third approach relies on the hypervisor or common mechanism being able to handle a fully-featured general-purpose OS and an RTOS. However, the communication mechanism between real-time and non-real-time parts can be complex and introduces its own latency. This is exacerbated by the fact that hypervisors are usually designed for security and isolation, rather than easy and fast communication between components.

SUMMARY

Embodiments according to the present invention eliminate the need for a real-time operating system (RTOS) or for any significant modification of the operating system (OS) to achieve low-latency interrupt handling on a system running a traditional OS (with or without any other real-time enhancement). An alternative interrupt delivery mechanism, compatible with the behavior of a normal userspace task in a general-purpose operating system, is introduced in parallel with (bypassing) the one used by the OS.

In an embodiment, a method for handling an interrupt includes receiving, in hardware or in firmware, a request from a task executing in userspace, where the request is to assign a function in the task and state information for the task to an interrupt. The state information describes the task that made the request, so that when the function is called, it will run in the context it was intended to run in as part of the task, even though the OS is being bypassed and thus cannot provide context switching to provide the context of the task. The hardware or firmware records the state information for the task, and assigns defined state information for the function to an event caused by the interrupt. When the interrupt occurs, the interrupt is serviced by saving context for the task in the memory, loading the defined state information for the function into registers, running the function, and then returning to the task preempted by the interrupt. Returning to the task preempted by the interrupt includes restoring the task's context (including the state information for the task), before the function may be called again for another task.

Embodiments according to the present invention introduce additional context and mode/exception-level switches, but bypass the kernel in interrupt delivery, and do not handle drivers, scheduling, and context management performed by the kernel. Embodiments according to the present invention utilize the ability of hardware or firmware to perform context switching that will be sufficient to run the function in the userspace task in a general-purpose OS. Context switching in the OS can be complex; in contrast, embodiments according to the present invention provide just enough context to run the function. While this requires some cooperation between the OS kernel, firmware, and hardware, that cooperation was demonstrated to be possible on, for example, Linux and Advanced RISC (reduced instruction set computing) Machine (ARM) Trusted Firmware (ATF) on ARM.

Depending on, for example, the hardware design, central processing unit (CPU) capabilities, and numbers of cores, embodiments according to the present invention can allow configuration of certain interrupts, delivery of interrupts to specific CPU cores, and static or dynamic configuration of interrupt identifiers used by buses, interrupt controllers, and CPU cores.

These and other objects and advantages of the various embodiments according to the present invention will be recognized by those of ordinary skill in the art after reading the following detailed description of the embodiments that are illustrated in the various drawing figures.

This summary contains, by necessity, simplifications, generalizations, and omissions of detail; consequently, those skilled in the art will appreciate that this summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF DRAWINGS

The accompanying drawings, which are incorporated in and form a part of this specification and in which like numerals depict like elements, illustrate embodiments according to the present invention and, together with the detailed description, serve to explain the principles of the invention.

DETAILED DESCRIPTION

Figure 1:
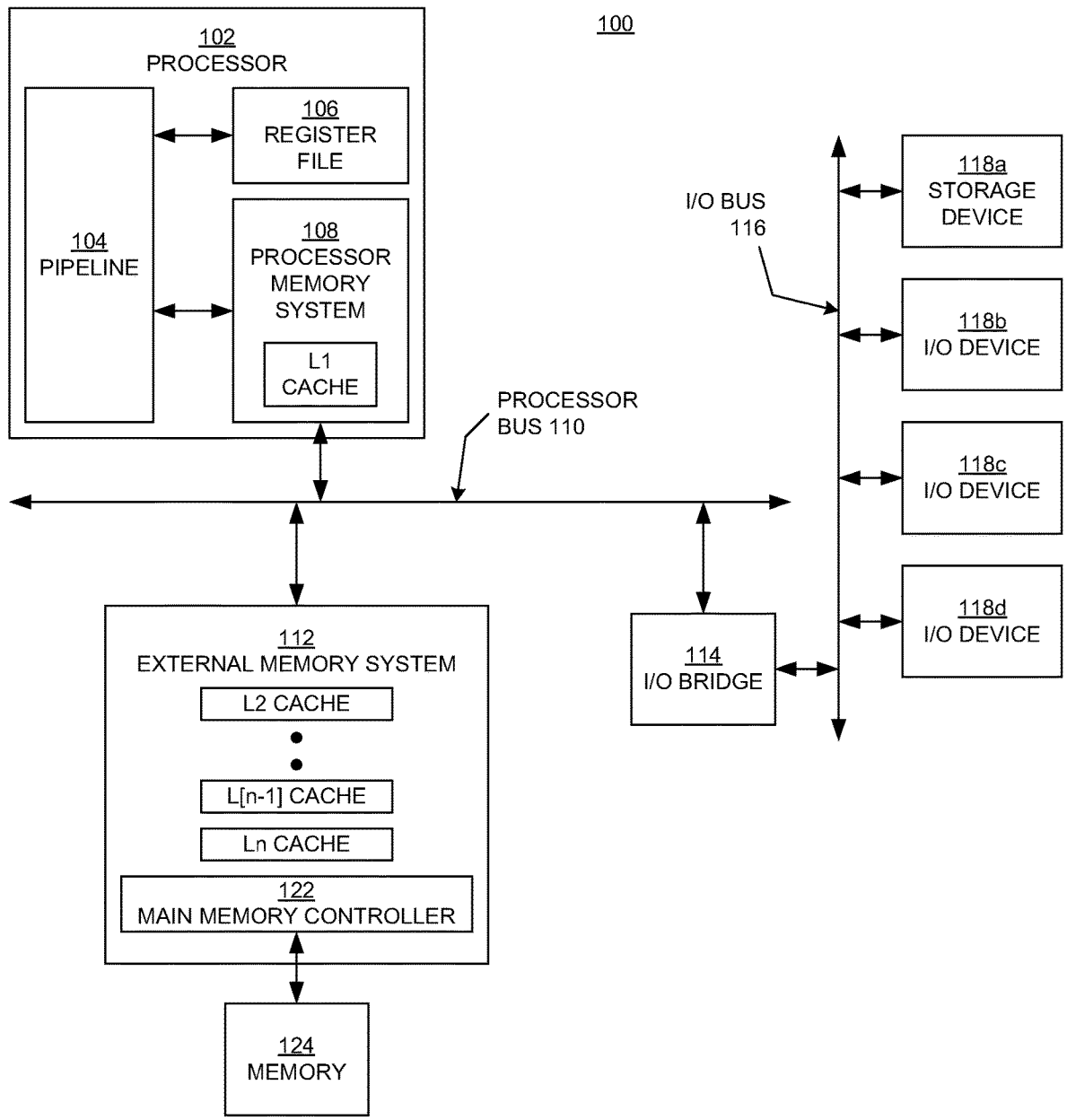
FIG. 1 is a block diagram illustrating an example of a computing system platform upon which embodiments according to the present invention can be implemented.

Reference will now be made in detail to the various embodiments according to the present invention, examples of which are illustrated in the accompanying drawings. While described in conjunction with these embodiments, it will be understood that they are not intended to limit the invention to these embodiments. On the contrary, the disclosure is intended to cover alternatives, modifications and equivalents, which may be included within the spirit and scope of the disclosure as defined by the appended claims.

Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "sending," "generating," "determining," "accessing," "selecting," "reading," "recording," "assigning," "performing," "processing," "loading," "storing," "saving," "running," "servicing," "executing," "loading," "returning," "preempting," "interrupting," or the like, refer to actions and processes (e.g., the flowchart 400 of FIG. 4) of a computing system or similar electronic computing device or processor (e.g., the computing systems 100 and 200 of FIGS. 1 and 2A, respectively). A computing system or similar electronic computing device manipulates and transforms data represented as physical (electronic) quantities within the computing system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), dynamic RAM, (DRAM), caches, read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Typical computer systems contain some software that is responsible for initializing hardware early in the boot process, running a bootloader that loads the operating system (OS), and performing certain services that may be called from a program running on a system. This software is often called firmware. The term "firmware" is used herein to describe a component that is activated early in the boot process (before the OS is loaded and perhaps before the bootloader is run) and that can remain accessible to hardware and software while the OS and applications are running. Usually such access is performed by hardware through interrupts that trigger interrupt service routines (ISRs) in firmware, and by software through implementing calls or interrupts in a hardware-specific manner.

Firmware often runs its services and ISRs in a separate mode, or exception level, different from the one used by userspace tasks and the OS kernel. The firmware may have devices, interrupts, and memory that are visible only from that mode, so OS and userspace tasks do not affect it directly, and so interrupts handled by the firmware do not interact with the OS interrupt-handling mechanism. This mode is often used simply to implement some functionality in firmware, in a way that is transparent to the OS.

Hardware usually includes interrupt controllers and other hardware that implements various kinds of processing of interrupt-causing events, directing interrupts to a particular central processing unit (CPU) core and causing it to handle those interrupts in a corresponding mode. For example, hardware may be programmed so one type of interrupt will be delivered to a particular core in a secure mode to be handled by firmware, while another type of interrupt may be directed to an OS kernel to run on another core. This can be achieved by programming registers or tables in memory that are used by controllers implementing this functionality. Handling of interrupts in such environments often causes multiple transactions through various buses before interrupt handling is performed by the CPU core.

CPU core hardware may only perform a minimal amount of state handling, and relies either on software saving most of the state or on hardware switching into a different mode, thus leaving some state in mode-specific registers, or both.

As will be described in further detail below, embodiments according to the present invention introduce an alternative interrupt delivery mechanism, compatible with the behavior of a normal userspace task in a general-purpose operating system, that can be used in parallel with the interrupt delivery mechanism used by the OS. Accordingly, the present invention eliminates the need for a real-time operating system (RTOS) or for any significant modification of the OS to achieve low-latency interrupt handling on a system running a traditional OS (with or without any other real-time enhancement).

FIG. 1 is a block diagram illustrating an example of a computing system 100 upon which embodiments according to the present invention can be implemented. The system 100 includes at least one processor 102, which can be a single CPU or one of multiple processor cores of a multi-core architecture (e.g., see the example of FIG. 2A). In the FIG. 1 example, the processor 102 includes a pipeline 104, one or more register files 106, and a processor memory system 108. The processor memory system 108 includes circuitry that implements a memory request manager for managing memory requests.

The processor 102 is connected to a processor bus 110, which enables communication with an external memory system 112 and an input/output (I/O) bridge 114. The I/O bridge 114 enables communication over an I/O bus 116 with various different I/O devices including, for example, a storage device 118a and other I/O devices 118b, 118c, and 118d (e.g., a network interface, display adapter, and/or user input devices such as a keyboard or mouse). The storage device 118a, such as a disk drive or other large capacity (typically nonvolatile) storage device, can also serve as secondary storage for the main memory 124 in a virtual memory scheme.

In the example computing system 100, the processor memory system 108 and external memory system 112 together form a hierarchical cache system, including at least a first level (L1) cache within the processor memory system, and any number of "higher-level" caches (L2, . . . , Ln) within the external memory system. The "highest-level" cache within the external memory system 112 (which may be the L2 cache if there are only two levels in the hierarchy) is the Ln cache, which is located closer to the memory module (main memory) 124—and furthest from the processor 102—than the other caches (L2, . . . , L[n–1]).

The distribution of caches within the processor memory system 108 and the external memory system 112 may be different in other implementations. For example, the L1 cache and the L2 cache can both be internal to the processor 102, and the L3 cache (and higher-level caches) can be external to the processor 102. If the processor 102 is a multi-core processor, each core can have its own internal L1 cache, and the cores can share an L2 cache (see the examples of FIG. 2A).

In the FIG. 1 example, the external memory system 112 also includes a main memory controller 122, which is connected to any number of memory modules (e.g., dynamic random access memory, DRAM, modules) that serve as the main memory 124.

Figure 2A:
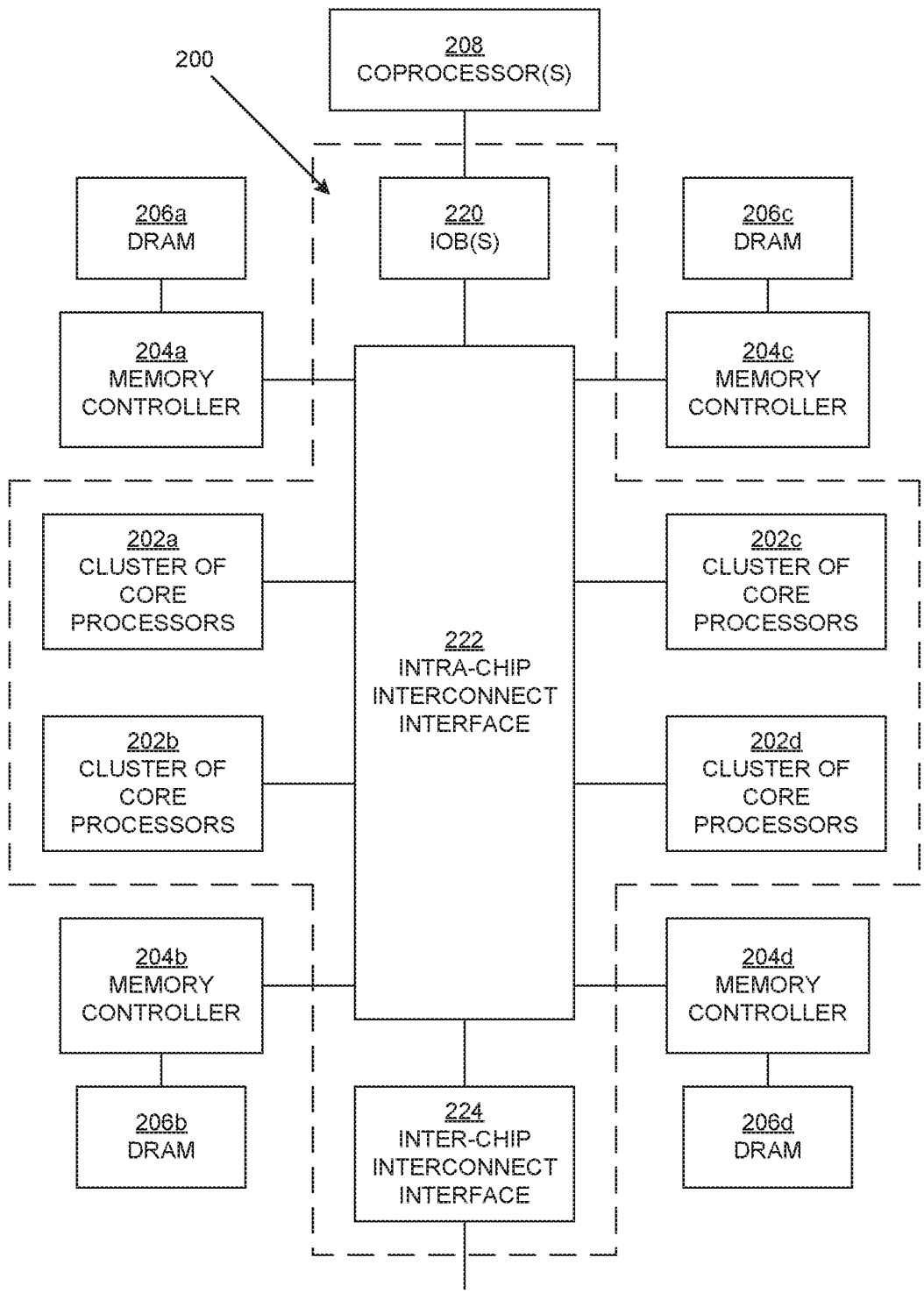
FIG. 2A is a block diagram illustrating another example of a computing system platform upon which embodiments according to the present invention can be implemented.

FIG. 2A is a block diagram illustrating another example of an architecture of a computing system 200 (e.g., a chip) upon which embodiments according to the present invention can be implemented. In the example architecture of FIG. 2A, the system 200 includes a number of core processors or CPUs. In an embodiment, the core processors are arranged in multiple clusters 202a, 202b, 202c, and 202d (202a-d), which may be referred to herein individually as a cluster 202 or collectively as clusters 202. While four clusters are shown, embodiments according to the present invention are not so limited.

The clusters 202 are coupled to one or more local memory controllers 204a, 204b, 204c, and 204d (204a-d). The memory controllers 204a-d are each configured to enable access to an external (or attached) memory (the main memory). The main memory may include multiple DRAMs 206a, 206b, 206c, and 206d, with each DRAM coupled to a respective memory controller. While four memory controllers and four DRAMs are shown in FIG. 2A, embodiments according to the invention are not so limited.

In embodiments, one or more coprocessors 208 are each coupled to the clusters 202 through a respective I/O bridge (IOB) 220. Each of the one or more coprocessors 208 may include, for example an I/O device, a compression/decompression processor, a hardware accelerator, a Peripheral Component Interconnect Express (PCIe) bus, or the like. Each of the one or more coprocessors 208 can be configured to store data in, or load data from, the caches 228a-d and 230a-d in a cluster 202 (refer to the discussion of FIG. 2B). Each of the one or more coprocessors 208 can also be configured to send, or assign, processing tasks to the clusters 202 (e.g., to core processors in the clusters). Accordingly, in an embodiment, the system 200 includes an intra-chip interconnect interface 222 that includes buses and is configured to couple the coprocessor(s) 208 to the clusters 202, and is also configured to couple the coprocessor and the clusters to the memory controllers 204a-d. Each of the coprocessors 208 can also be configured to receive data or processing tasks from other components including other systems that may be like the system 200. Accordingly, in an embodiment, the system 200 also includes an inter-chip interconnect interface 224 that includes buses and channels and is configured to couple the system 200 to other systems. Thus, the system 200 is configured to exchange data and processing tasks with other systems.

Figure 2B:
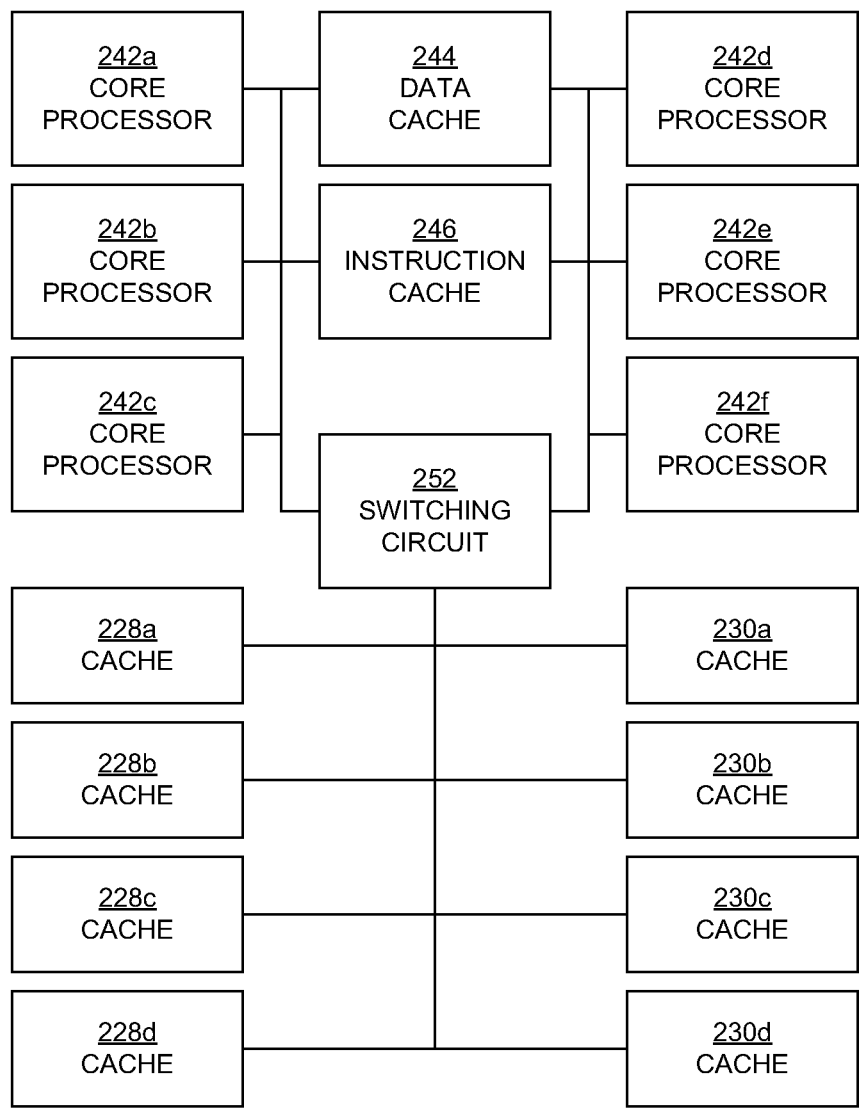
FIG. 2B is a block diagram illustrating an example of a cluster of core processors in an embodiment according to the present invention.

FIG. 2B is a block diagram illustrating an example of a cluster 202 of core processors in an embodiment according to the present invention. The cluster 202 may include components other than those shown or about to be described.

In the FIG. 2B embodiment, the cluster 202 includes six core processors 242a, 242b, 242c, 242d, 242e, and 24f (242a-f), which may be referred to herein individually or collectively as, respectively, a core processor 242 or core processors 242. The core processors 242 may also be known as application processors. While six core processors are shown, the present invention is not so limited.

In the FIG. 2B embodiment, a cluster 202 also includes at least one data cache 244 and at least one instruction cache 246. The data cache 244 may be referred to as a level-one (L1) cache.

In the FIG. 2B embodiment, a cluster 202 also includes a shared cache, which may be referred to as a level-two (L2) cache or lower-level cache. In an embodiment, the shared cache is accessible to the core processors 242 through, for example, a switching circuit 252. In an embodiment, the shared cache is partitioned into multiple caches 228a, 228b, 228c, 228d (228a-d) and 230a, 230b, 230c, and 230d (230a-d).

Figure 3:
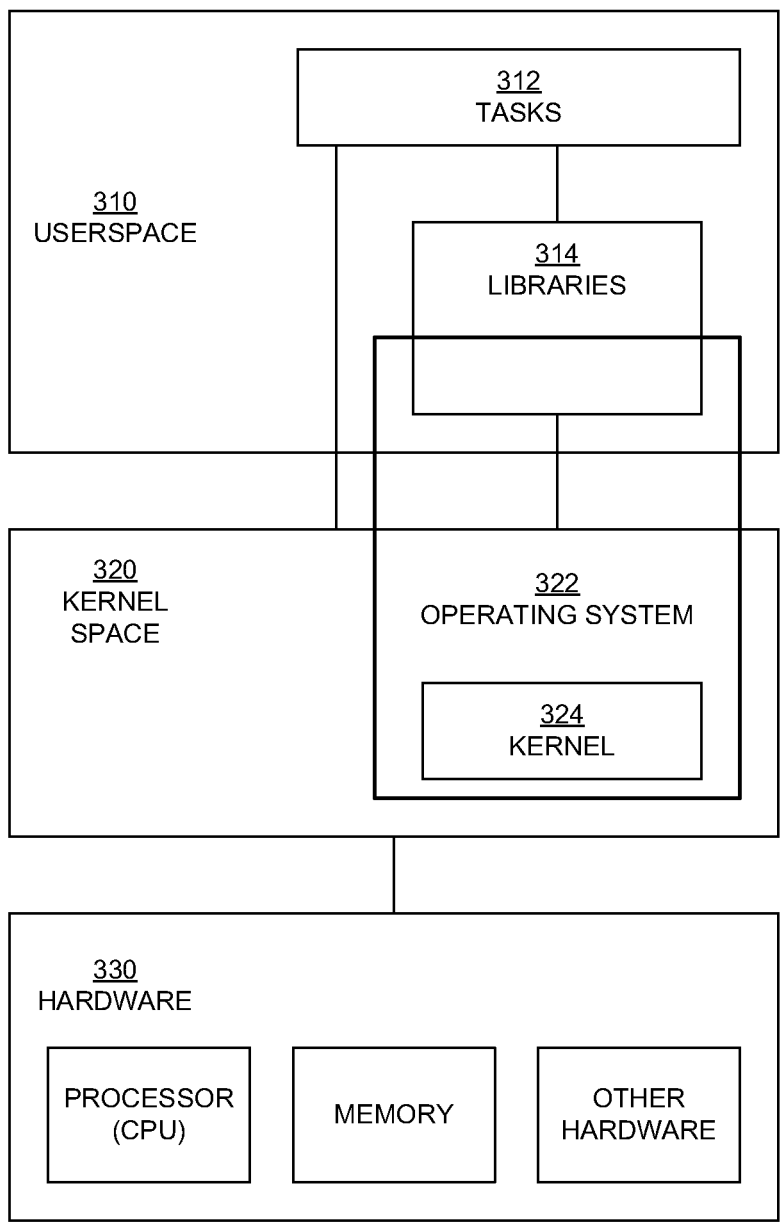
FIG. 3 illustrates an example of a computer system architecture in embodiments according to the present invention.

FIG. 3 illustrates an example of a computer system architecture 300 in embodiments according to the present invention. In these embodiments, the architecture 300 includes userspace 310, kernel space 320, and hardware 330. The architecture 300 can be incorporated in or implemented on a hardware platform such as the computing systems 100 and 200 of FIGS. 1 and 2A, respectively. In particular, userspace 310 and kernel space 320 can reside in memory of the computing systems 100 and 200.

Userspace 310 includes the portions of memory where processes, applications, and programs 312, referred to generally herein collectively as tasks 312 and individually as a task 312, are run. Userspace 310 can also include libraries 314.

Kernel space 320 includes the portions of memory where the OS 322, which includes the kernel 324, are executed.

Hardware 330 includes the hardware components of the computing systems 100 and 200 described above, and also includes the firmware that is resident on that hardware. For example, firmware can be held in non-volatile memory devices such as ROM, EEPROM, and flash memory.

Figure 4:
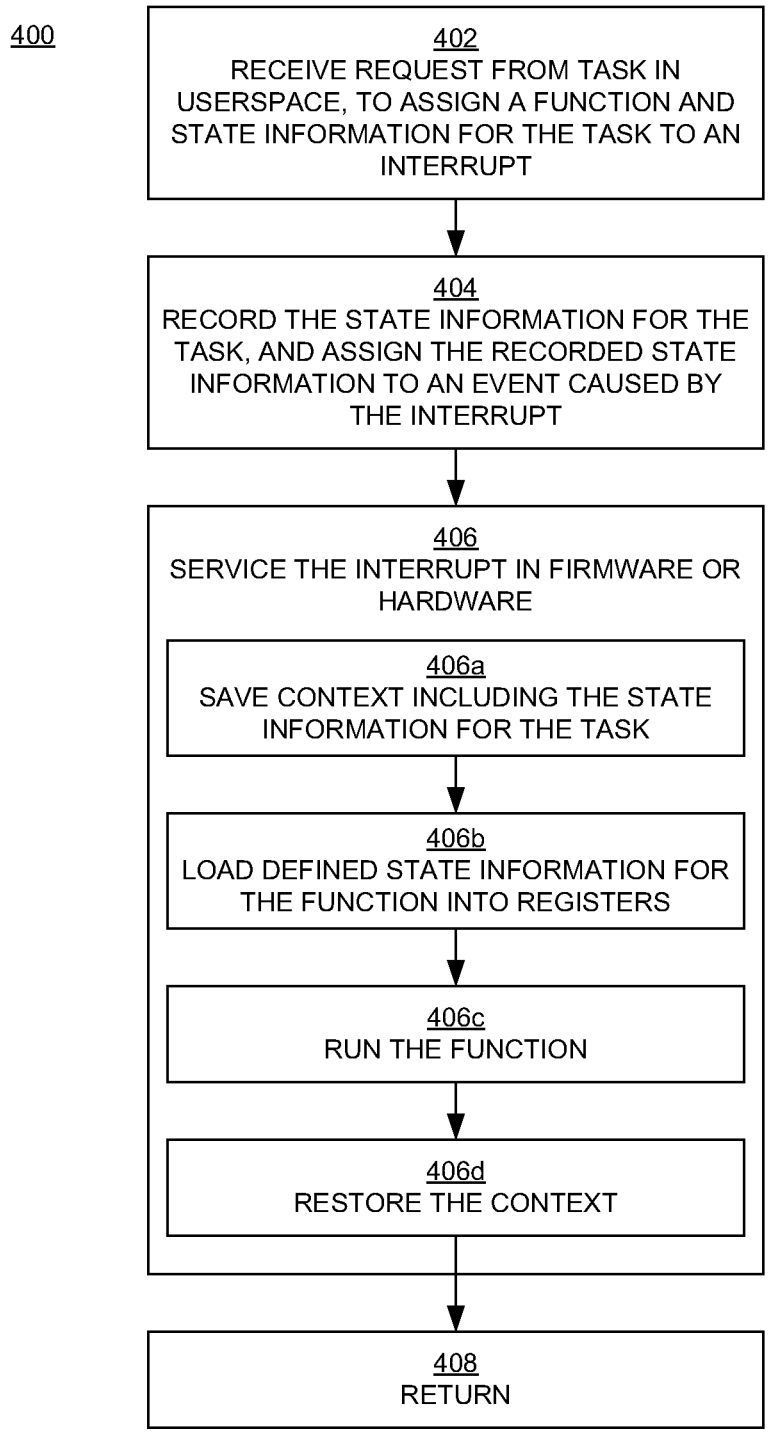
FIG. 4 is a flowchart of examples of operations in computer-implemented methods for interrupt servicing in userspace in embodiments according to the present invention.

FIG. 4 is a flowchart 400 of examples of operations in computer-implemented methods for interrupt servicing in userspace in embodiments according to the present invention. The operations can be performed in and by the architecture 300 (FIG. 3) of the computing systems 100 and 200 (FIGS. 1 and 2A, respectively).

As used herein, context includes the current state of a task 312 running in userspace 310. That is, at any point in time as the task is executing, there is a state associated with that task. The state of a task describes the task and includes the contents of (e.g., the set of values in) the hardware registers of the CPU executing the task, and may also include values stored in other memory locations. The set of values may be referred to herein as state information. State information for a task can include, for example, a virtual memory configuration, a program counter value, and a stack pointer value.

Context for a task can also include a description of the environment in which the task is running. The environment of a running task includes information maintained by the OS 322 and associated with interactions between the OS and the task, including identifiers and objects managed by the OS, for example. For example, the kernel 324 may contain information that is not a part of any task (e.g., scheduler information of a scheduler that manages the tasks).

Thus, context for a task can include both the state of a task (which includes the state information for the task) and a description of the environment in which the task is running. Context can be specific to the type of OS 322; however, the interrupt handling methodology disclosed herein is not limited to a specific type of operating system.

When an interrupt occurs, execution of the task that is running at the time of the interrupt is stopped. In the case of an interrupt, context for the task includes the information (the state of the task at the time of the interrupt, and the environment at the time of the interrupt) that should be saved in registers and possibly other memory locations and subsequently restored to allow functioning of the OS 322 and the task 312 after the interrupt is handled so that execution of the task can resume where it left off.

To handle an interrupt, the CPU needs to start from a known state (that includes state information) that is associated with the interrupt. The known state associated with the interrupt can depend on the type of interrupt, and is defined and stored in advance of the interrupt (e.g., in registers). An interrupt is serviced by an interrupt handler for the type of interrupt.

In block 402 of FIG. 4, a request from a task executing in userspace is received in hardware or firmware, where the request is to assign a function in the task and state information for the task to an interrupt. The state information for the task describes the task that made the request, so that when the function is called, the function will run in the context it was intended to run in, or in a sufficient subset or approximation of the context it was intended to run in, as part of the task, even though the OS is being bypassed and thus cannot provide context switching to provide the context of the task.

In block 404, the hardware or firmware records the state information for the task, and assigns the recorded state information to an event caused by the interrupt that can be handled by the interrupt handler. The state information recorded per the request describes the task or the function in the task, so that the function will be called in the context for which it was intended and compiled for as part of the task.

In block 406, when the interrupt occurs, the interrupt is serviced. In an embodiment, the CPU switches to the mode or exception level appropriate for running the ISR. In embodiments, in block 406a, context for the task (including the state information for the task) is saved in memory or in an alternative set of registers that are available while the interrupt is active; in block 406b, defined state for the function (known state information or set of values that is defined for the function and stored in advance) is loaded into registers; and in block 406c, the function is run by the CPU. In block 406d, the context of the task preempted by the interrupt is restored, before the function may be called again for another task.

In block 408, the end of the interrupt is processed and the ISR is completed, returning to the task preempted by the interrupt.

Specifically, in embodiments, the OS kernel and either firmware, interrupt-handling hardware, or both, are modified to allow the userspace task to send a request to the firmware or hardware to assign a function in the userspace task, along with state information for the task such as the state of virtual memory and the position of the stack, to an interrupt. The firmware or hardware records the state information for the task (e.g., virtual memory configuration, program counter value, and stack pointer value) that should be set to call the ISR, and assigns the state information to a defined or dynamically configured event caused by the interrupt.

When the interrupt occurs, it causes the CPU to switch to the appropriate mode. Then, if interrupt handling is implemented in the hardware, context including the recorded state information for the task is saved in a defined area of memory or in registers (or an alternative set of registers is provided for the time while interrupt handling is active), registers that correspond to a defined and recorded state of the function are filled with corresponding state information (set of values) for the function, and the CPU is switched into the mode that is used to run that function. If interrupt handling is implemented in the firmware, the same operations can be performed by an ISR that runs in its own mode, and the firmware ISR can use memory reserved for it to store context and user routine lookup information.

The function is called in its normal context, asynchronously with anything that may be preempted by this interrupt, so the function will not interact with the OS and other components. However, the function can access memory (and see all variables visible to the task) because it runs in its original context or in a sufficient approximation of its original context, and everything configured by a compiler and linker still applies.

The function will safely access shared data, with virtual addresses mapped to the physical addresses, as long as this mapping was established before the interrupt happened, because the OS will not be able to handle a page fault from this state. To guarantee that this is the case, before interrupts are processed in this manner, virtual memory management should be configured to keep those addresses mapped using the interface provided by the OS, firmware or hardware. This can usually be achieved utilizing the OS rules for virtual memory management and by configuring "locked memory" regions or pages that are supposed to remain mapped until unlocked or until the end of the task. The function may not alter the CPU state or use CPU registers if they are not saved as a part of the context switching performed by firmware.

Firmware or hardware can process the end of the interrupt, restore the original context, and complete the ISR, and then return to what (e.g., userspace, kernel) was preempted.

Embodiments according to the present invention introduce additional context and mode/exception-level switches, but bypass the kernel in interrupt delivery, and do not handle any drivers, scheduling, and context management performed by the kernel. Embodiments according to the present invention utilize the ability of hardware or firmware to perform context switching that will be sufficient to run a function in a userspace task in a general-purpose OS. While this requires some cooperation between the OS kernel, firmware, and hardware, that cooperation was demonstrated to be possible on Linux and Advanced RISC (reduced instruction set computing) Machine (ARM) Trusted Firmware (ATF) on ARM.

Depending on, for example, the hardware design, central processing unit (CPU) capabilities, and numbers of cores, embodiments according to the present invention can allow configuration of certain interrupts, delivery of interrupts to specific CPU cores, and static or dynamic configuration of interrupt identifiers used by buses, interrupt controllers, and CPU cores.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The example methods described and/or illustrated herein may also omit one or more of the steps described or illustrated herein or include additional steps in addition to those disclosed.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

Although the subject matter has been described in language specific to structural features and/or methodological acts, it is to be understood that the subject matter defined in the disclosure is not necessarily limited to the specific features or acts described above. Rather, the specific features and acts described above are disclosed as example forms of implementing the present invention.

Embodiments according to the invention are thus described. While the present invention has been described in particular embodiments, it should be appreciated that the invention should not be construed as limited by such embodiments, but rather construed according to the following claims.

What is claimed is:

1. A method, comprising:
    receiving a request sent by a task executing in userspace, wherein the request is to assign a function that is in the task in the userspace and state information for the task to an interrupt that can preempt the task;
    recording the state information for the task and assigning the recorded state information for the task to an event caused by the interrupt;
    servicing the interrupt, wherein said servicing the interrupt comprises:
        saving context including the state information for the task in memory;
        loading defined state information for the function into registers; and
        running the function, wherein during said running, the function accesses the defined state information for the function in the registers; and
    returning to the task preempted by the interrupt.

2. The method of claim 1, wherein the interrupt is serviced by one of: hardware; and firmware resident in the hardware.

3. The method of claim 2, wherein if the interrupt is serviced by the hardware, then a central processing unit runs the function.

4. The method of claim 2, wherein if the interrupt is serviced by the firmware, then an interrupt service routine runs the function.

5. The method of claim 2, wherein the request is received in one of: the hardware and the firmware.

6. The method of claim 1, wherein the state information comprises virtual memory configuration, program counter value, and stack pointer value.

7. The method of claim 1, wherein the function runs asynchronously with tasks preempted by the interrupt.

8. A system, comprising:
    a central processing unit (CPU); and
    memory coupled to the CPU, wherein the memory comprises userspace and kernel space;
    wherein the system is operable for executing instructions that, when executed, perform operations comprising:
        receiving a request sent by a task executing in the userspace, wherein the request is to assign a function that is in the task in the userspace and state information for the task to an interrupt that can preempt the task;
        recording the state information for the task and assigning the recorded state information for the task to an event caused by the interrupt;
        servicing the interrupt, said servicing the interrupt comprising:
            saving context including the state information for the task in the memory;
            loading defined state information for the function into registers; and
            running the function, wherein during said running, the function accesses the defined state information for the function in the registers; and
        returning to the task preempted by the interrupt.

9. The system of claim 8, wherein the interrupt is serviced by one of: hardware; and firmware resident in the hardware.

10. The system of claim 9, wherein if the interrupt is serviced by the hardware, then the CPU runs the function.

11. The system of claim 9, wherein if the interrupt is serviced by the firmware, then an interrupt service routine runs the function.

12. The system of claim 9, wherein the request is received in one of: the hardware and the firmware.

13. The system of claim 8, wherein the state information comprises virtual memory configuration, program counter value, and stack pointer value.

14. The system of claim 8, wherein the function runs asynchronously with tasks preempted by the interrupt.

15. A non-transitory computer-readable medium having computer-readable instructions stored thereon which, when executed by a processor, cause the processor to execute a method comprising:
    receiving a request sent by a task executing in userspace, wherein the request is to assign a function that is in the task in the userspace and state information for the task to an interrupt that can preempt the task;
    recording the state information for the task;
    assigning the recorded state information for the task to an event that triggers the interrupt;
    servicing the interrupt, said servicing the interrupt comprising:
        saving context including the state information for the task in memory;
        loading defined state information for the function into registers; and
        running the function, wherein during said running, the function accesses the defined state information for the function in the registers; and
    returning to the task preempted by the interrupt.

16. The non-transitory computer-readable medium of claim 15, wherein the interrupt is serviced by one of: hardware; and firmware resident in the hardware.

17. The non-transitory computer-readable medium of claim 16, wherein if the interrupt is serviced by the hardware, then a central processing unit runs the function.

18. The non-transitory computer-readable medium of claim 16, wherein if the interrupt is serviced by the firmware, then an interrupt service routine runs the function.

19. The non-transitory computer-readable medium of claim 15, wherein the state information comprises virtual memory configuration, program counter value, and stack pointer value.

20. The non-transitory computer-readable medium of claim 15, wherein the function runs asynchronously with tasks preempted by the interrupt.

* * * * *